United States Patent
Inagaki et al.

(10) Patent No.: US 6,947,484 B2
(45) Date of Patent: Sep. 20, 2005

(54) BIT PLANE CODING APPARATUS

(75) Inventors: Takunari Inagaki, Saitama (JP); Rui Miyamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 287 days.

(21) Appl. No.: 10/400,423

(22) Filed: Mar. 27, 2003

(65) Prior Publication Data

US 2003/0191914 A1 Oct. 9, 2003

(30) Foreign Application Priority Data

Mar. 28, 2002 (JP) .................................... P2002-092883

(51) Int. Cl.⁷ ............................................ H04N 11/02
(52) U.S. Cl. ................................................ 375/240.02
(58) Field of Search ............... 341/56–65; 375/240.24; 711/156, 114; 382/232–239

(56) References Cited

U.S. PATENT DOCUMENTS 5,023,710 A  *  6/1991  Kondo et al. .......... 375/240.24
5,163,103 A  * 11/1992  Uetani ..................... 382/250
5,881,173 A  *  3/1999  Ohmori .................... 382/232
5,966,465 A  * 10/1999  Keith et al. ............... 382/232
6,847,735 B2 *  1/2005  Kajiwara et al. ........... 382/233

* cited by examiner

Primary Examiner—Nasser Moazzami
(74) Attorney, Agent, or Firm—Frommer Lawrence & Haug LLP; William S. Frommer (57) ABSTRACT

This apparatus performs search for a bit plane where the first significant coefficient appears, as preprocessing of EBCOT coding processing of JPEG2000. This apparatus has a register for holding bit position data for each code block. In this apparatus, a code block of absolute value data of each inputted wavelet coefficient is identified and OR of the inputted absolute value data and the bit position data stored in the register is calculated. In this apparatus, the result of the calculation is stored again into the register as new bit position data. In this apparatus, the above-described OR calculation is performed to all the data in a wavelet transform area as a coding target, and the most significant bit plane of bit planes including a bit having a valid value is calculated for each block on the basis of the ultimately obtained bit position data.

4 Claims, 9 Drawing Sheets

```
wire [10:0] IN1;
reg [3:0] OUT1;
   casez (IN1)
      11'b000_0000_0000:    OUT1=4'b1111;
      11'b1??_????_????:    OUT1=4'b1010;
      11'b01?_????_????:    OUT1=4'b1001;
      11'b001_????_????:    OUT1=4'b1000;
      11'b000_1???_????:    OUT1=4'b0111;
      11'b000_01??_????:    OUT1=4'b0110;
      11'b000_001?_????:    OUT1=4'b0101;
      11'b000_0001_????:    OUT1=4'b0100;
      11'b000_0000_1???:    OUT1=4'b0011;
      11'b000_0000_01??:    OUT1=4'b0010;
      11'b000_0000_001?:    OUT1=4'b0001;
      11'b000_0000_0001:    OUT1=4'b0000;
   endcase
```

FIG.4

```
wire [3:0] IN2;
reg [10:0] OUT2;
  case (IN2)
    4'b0000:OUT2=11'b000_0000_0001;
    4'b0001:OUT2=11'b000_0000_0010;
    4'b0010:OUT2=11'b000_0000_0100;
    4'b0011:OUT2=11'b000_0000_1000;
    4'b0100:OUT2=11'b000_0001_0000;
    4'b0101:OUT2=11'b000_0010_0000;
    4'b0110:OUT2=11'b000_0100_0000;
    4'b0111:OUT2=11'b000_1000_0000;
    4'b1000:OUT2=11'b001_0000_0000;
    4'b1001:OUT2=11'b010_0000_0000;
    4'b1010:OUT2=11'b100_0000_0000;
    4'b1111:OUT2=11'b000_0000_0000;
endcase
```

```
wire [10:0] IN3;
reg [3:0] OUT3;
  casez (IN3)
    11'b000_0000_0000:   OUT3=4'b0000;
    11'b1??_????_????:   OUT3=4'b1011;
    11'b01?_????_????:   OUT3=4'b1010;
    11'b001_????_????:   OUT3=4'b1001;
    11'b000_1???_????:   OUT3=4'b1000;
    11'b000_01??_????:   OUT3=4'b0111;
    11'b000_001?_????:   OUT3=4'b0110;
    11'b000_0001_????:   OUT3=4'b0101;
    11'b000_0000_1???:   OUT3=4'b0100;
    11'b000_0000_01??:   OUT3=4'b0011;
    11'b000_0000_001?:   OUT3=4'b0010;
    11'b000_0000_0001:   OUT3=4'b0001;
  endcase
```

FIG.7

```
wire [3:0] OUT3,IN4;
reg [3:0] OUT4;

OUT4=(OUT3>IN4) ? OUT3 : IN4;
```

BIT PLANE CODING APPARATUS

BACKGROUND OF THE INVENTION

1. Field of the Invention

This invention relates to a bit plane coding apparatus applied to EBCOT (embedded block coding with optimized truncation), which is one of entropy coding methods.

This application claims priority of Japanese Patent Application No. 2002-092883, filed on Mar. 28, 2002, the entirety of which is incorporated by reference herein.

2. Description of the Related Art

Recently, a static image compression system using discrete wavelet transform called JPEG2000 (ISO/IEC JTC 1/SC 29/WG1) has been proposed.

In JPEG2000, in order to utilize the characteristics of discrete wavelet transform, a coding method called EBCOT (embedded block coding with optimized truncation) is used for entropy coding processing.

EBCOT transforms a multi-valued data sequence to a binary coding sequence by performing two types of processing, that is, bit modeling processing, and arithmetic coding processing. In the case where this EBCOT is applied to a coding algorithm of JPEG2000, processing to generate a binary symbol for arithmetic coding and a context representing its coding system from a multi-valued wavelet coefficient generated by discrete wavelet transform is performed in bit modeling processing, and processing to segment a probability line in accordance with the probability of occurrence of the generated symbol sequence and allocate a binary decimal value indicating a position within a segment to a code corresponding to the code sequence is performed in arithmetic coding processing.

In the coding algorithm of JPEG2000, an area to which wavelet transform has been performed (wavelet transform area) is divided into plural two-dimensional rectangular areas, and EBCOT processing is performed to each of the division units. The rectangular area to which EBCOT has been performed is called code block.

Code Block Division Processing

The code block will now be described.

In JPEG2000, two-dimensional wavelet transform is performed to two-dimensional image data. In two-dimensional wavelet transform, filtering of a wavelet transform region is carried out in the order of the vertical direction and horizontal direction, thus dividing the region into subbands of low-frequency components and high-frequency components. Therefore, the wavelet transform region after wavelet transform is performed has been divided into a subband including a coefficient of a horizontal low-frequency component and a vertical low-frequency component (LL coefficient), a subband including a coefficient of a horizontal high-frequency component and a vertical low-frequency component (HL coefficient), a subband including a coefficient of a horizontal low-frequency component and a vertical high-frequency component (LH coefficient), and a subband including a coefficient of a horizontal high-frequency component and a vertical high-frequency component (HH coefficient). Each subband has resolution that is ½ of that of the wavelet transform region prior to the transform, both vertically and horizontally.

Moreover, in JPEG2000, it is possible to recursively divide the band of two-dimensional data by performing wavelet transform again to the LL coefficient. Therefore, the subband of the LL coefficient is further subdivided into a subband of an LL coefficient, a subband of an HL coefficient, a subband of an LH coefficient and a subband of an HH coefficient. The number of recursive divisions is called resolution level. Resolution level 1 means to perform wavelet transform once to a wavelet transform region. Resolution level 2 means to perform wavelet transform twice to a wavelet transform region.

Figure 9:
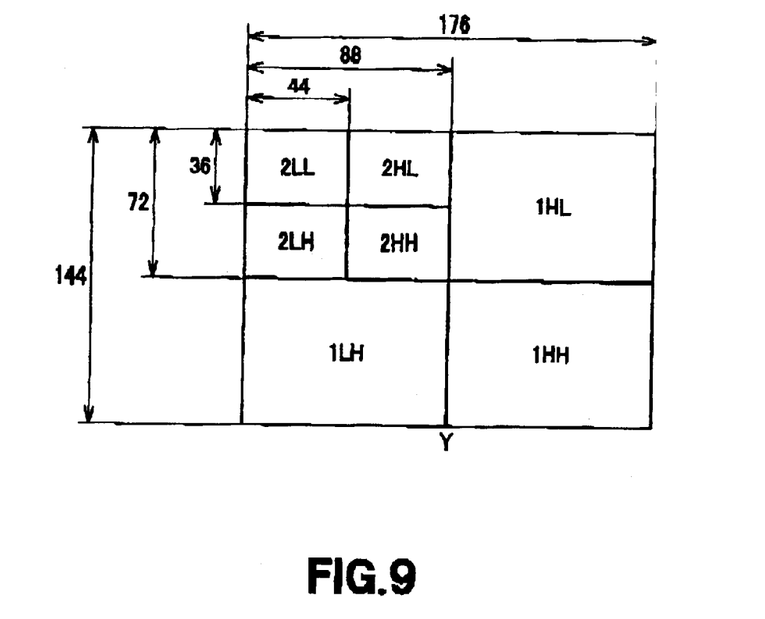
FIG. 9 is a view showing subbands of a luminance component in the case where wavelet transform of resolution level 2 is performed to 4:2:2-format image data with resolution of 176 horizontal pixels and 144 vertical pixels.
Figure 10:
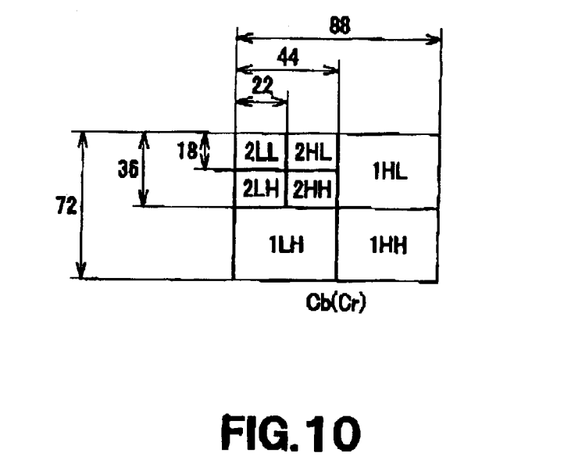
FIG. 10 is a view showing subbands of color-difference components in the case where wavelet transform of resolution level 2 is performed to 4:2:2-format image data with resolution of 176 horizontal pixels and 144 vertical pixels.

FIGS. 9 and 10 show the state of a wavelet transform region in the case wavelet transform of resolution level 2 is performed to image data of 4:2:2 format with resolution of 176 horizontal pixels and 144 vertical pixels. FIG. 9 shows a wavelet transform region of a huminance component (Y). FIG. 10 shows a wavelet transform region of color-difference components (Cb, Cr).

As shown in FIGS. 9 and 10, in the wavelet transform region after wavelet transform, a subband of an HL coefficient (1HL), a subband of an LH coefficient (1LH) and a subband of an HH coefficient (1HH) are formed, These subbands are formed by performing the first wavelet transform to the original 4:2:2-format image. Specifically, the resolution of each of the subbands 1HL, 1LH and 1HH is 88 horizontal pixels×vertical 72 pixels for the luminance component and 44 horizontal pixels×36 vertical pixels for the color-difference components.

Moreover, in the wavelet transform region after wavelet transform, a subband of an LL coefficient (2LL), a subband of an HL coefficient (2HL), a subband of an LH coefficient (2LH) and a subband of an HH coefficient (2HH) are formed. These subbands are formed by performing the second wavelet transform to the subband of the LL coefficient (1LL) formed by the first wavelet transform. Each of the subbands 2LL, 2HL, 2LH and 2HH has resolution that is ¼ of that of the original 4:2:2-format image. That is, the resolution of each of the subbands 2LL, 2HL, 2LH and 2HH is 44 horizontal pixels×vertical 36 pixels for the luminance component and 22 horizontal pixels×18 vertical pixels for the color-difference components.

In the case of performing EBCOT in JPEG2000, each of such subbands is further divided into code blocks. The following are division rules for code blocks in JPEG02000.

One code block is necessarily closed within one subband. That is, one code block does not include two or more subbands.

The size of a basic code block is constant irrespective of the size of a subband. The size of a basic code block is, for example, 64×64 pixels.

However, if the size of a basic code block is larger than the size of a subband, the size of the subband itself is the size of the code block. For example, if the size of a subband is smaller than 64×64 pixels, the range of the subband itself becomes a code block.

On the contrary, if the size of a code block is smaller than the size of a subband, plural code blocks are set within one subband. In this case, one or more of the above-described basic code blocks is set within one subband and a code block with a smaller size than that of the basic code block is set in a surplus part. The number of pixels on one side of the code block set in the surplus part is equal to or less than the size of the basic code block (for example, 64×64).

Figure 11:
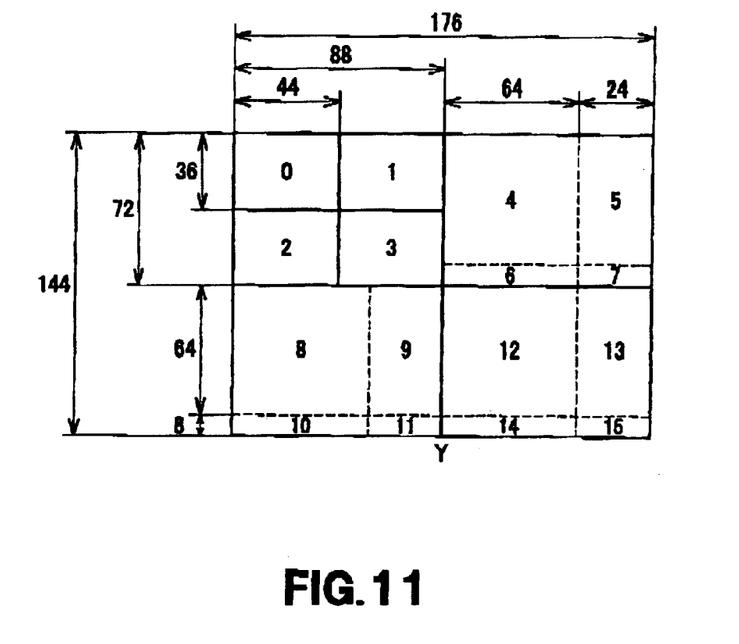
FIG. 11 is a view for explaining the case of dividing each subband shown in FIG. 9 into code blocks.
Figure 12:
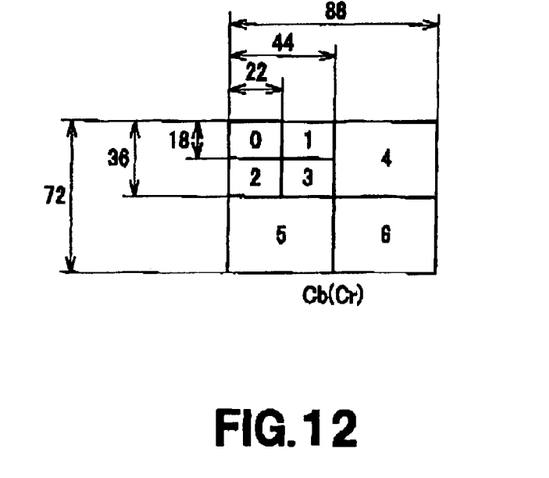
FIG. 12 is a view for explaining the case of dividing each subband shown in FIG. 10 into code blocks.

FIGS. 11 and 12 shows specific examples of code blocks set in the wavelet transform region shown in FIGS. 9 and 10.

The subbands 2LL, 2HL, 2LH and 2HH of the luminance component (Y) have a size (43×36) that is smaller than the size of the basic code block (64×64). Therefore, in each of the subbands 2LL, 2HL, 2LH and 2HH of the luminance component (Y), one code block of the same size as each subband is set. That is, the subbands 2LL, 2HL, 2LH and 2HH of the luminance component (Y) are coincident with the code blocks.

The subbands 1HL, 1LH and 1HH of the luminance component (Y) have a size (88×72)that is larger than the size of the basic code block. Therefore, in each of the subbands 1HL, 1LH and 1HH of the luminance component (Y), plural code blocks are set. Specifically, in each of the subbands 1HL, 1LH and 1HH of the luminance component (Y), one code block of 64×64 pixels, one code block of 24×64 pixels, one code block of 64×8 pixels and one code block of 24×8 pixels are set.

All the subbands of the color-difference components (Cr, Cb) have a size that is smaller than the size of the basic code block (64×64). Therefore, in each of the subbands of the color-difference components (Cr, Cb), one code block of the same size as each subband is set.

In this manner, in the wavelet transform region shown in FIGS. 9 and 10, 16 subband are set for the luminance component (Y) and seven subbands are set for each of the two color-difference components (Cr, Cb).

Preprocessing of Bit Modeling

Bit modeling processing in EBCOT will now be described in detail.

The bit modeling processing is the processing to generate a binary symbol for subsequent arithmetic coding and a context representing its coding system from a multi-valued wavelet coefficient, as described above. In other words, the bit modeling processing is the processing to decide a coding system for arithmetic coding.

A coding unit in the bit modeling processing is the above-described code block. Moreover, in the bit modeling processing, coding processing is performed using a unit called bit plane, formed by slicing this code block by bit (by digit).

The multi-valued wavelet coefficient as a coding target of EBCOT is an integer with a positive or negative sing (or an integer expressed in real number). In the bit modeling processing, the multi-valued wavelet coefficient is split into its positive or negative sign and absolute value, which are then coded. For the absolute value part, a bit plane is selected in the order from the upper bit to the lower bit, and each bit is coded while each bit on the bit plane is scanned in a predetermined order.

Each bit within the bit plane as a coding target is coded on the basis of one of the following three types of processing passes:

a significance propagation pass (i.e., a pass for coding an "insignificant" coefficient around which a "significant" coefficient exists);

a magnitude refinement pass (i.e., a pass for coding a "significant" coefficient); and a cleanup pass (i.e., a pass for coding the remaining coefficient).

There are four types of coding methods carried out in the respective processing passes, that is, zero coding, sign coding, magnitude refinement coding, and run-length coding.

The meaning of a coefficient's being "significant" or "insignificant" is as follows.

Being "significant" is the state where it is found that the value of a target multi-valued wavelet coefficient is not "0" from the result of the coding processing up to this point. In other words, it is the state of the multi-valued wavelet coefficient in which a bit of "1" is found in the procedure of coding while sequentially scanning from the bit plane of the upper bit.

Being "insignificant" is the state where the value of a target multi-valued wavelet coefficient is "0"or can be "0".

In other words, it is the state of the multi-valued wavelet coefficient in which a bit of"1" is not found in the procedure of coding while sequentially scanning from the bit plane of the upper bit.

In the bit modeling processing, initial bit plane search processing is carried out when performing coding in the above-described three processing passes.

The initial bit plane search processing is the processing to detect an "initial bit plane" in each code block. The initial bit plane is the bit plane of the uppermost digit of the bit planes including a bit having a valid value (that is, a bit having a value"1" in the case of positive logic).

The following are the specific processing procedures.

An absolute value component of the wavelet coefficient is extracted and a bit plane is selected for each digit from the uppermost digit (MSB) to the lower digits of the absolute value component. All the bit values within the selected bit planes are searched. In this case, whether or not a "significant" coefficient (a coefficient including a bit that is not "0") exists in the bit plane is judged. If there is a bit plane in which a "significant" coefficient appears, that is, if a bit plane including a bit having an initial value of "1" is found, this bit plane is used as an initial bit plane.

In the bit modeling processing, coding in the above-described three processing passes is carried out, starting at this initial bit plane. In the bit modeling processing, if bit planes consisting of insignificant bits, that is, bit planes consisting of "0" bits alone continue from MSB, the number of such bit planes is described in a packet header of a coding stream. This value is used in decoding. It is used for forming an all-"0" bit plane and also used for restoring the dynamic range of the multi-valued wavelet coefficient.

SUMMARY OF THE INVENTION

It is an object of the present invention to provide a bit plane coding apparatus which enables initial bit plane search processing as carried out in coding processing by bit plane, for example, in EBCOT, with a simple circuit structure.

A bit plane coding apparatus according to the present invention is a bit plane coding apparatus for dividing a data group including plural data with their absolute value components expressed by n bits (n being a natural number) into at least one or more blocks and coding each of the blocks by bit plane.

The bit plane coding apparatus according to the present invention has bit plane search means for searching each block for the most significant bit plane of bit planes including a bit having a valid value (valid bit).

This bit plane search means has a storage unit for storing bit position data of the n bits in association with each block within the data group, a selection control unit for selecting bit position data in the storage unit, and a bit OR calculating unit to which the absolute value component of each data constituting the data group and which calculates bit OR of the inputted absolute value component and the bit position data selected by the selection control unit.

The selection control unit reads out bit position data of a block to which the absolute value component inputted to the bit OR calculating unit belongs, from the storage unit, then causes the OR calculating unit to calculate bit OR of the bit position data and the inputted absolute value component, stores the result of the calculation into the storage unit as new bit position data of the block, and calculates the most significant bit plane of the bit planes including a bit having a valid value (valid bit) for each block on the basis of the bit position data stored in the storage unit after all the data of the data group is inputted.

In the above-described bit plane coding apparatus of the present invention, OR of the inputted data and the bit position data is calculated while holding the bit position data identified for each block and identifying the block of each inputted data. In the bit plane coding apparatus of the present invention, the result of the calculation is held as new bit position data. In the bit plane coding apparatus of the present invention, the above-described OR calculation is carried out for all the data of the data group as a coding target, and the most significant bit plane of bit planes including a bit having a valid value is calculated for each block on the basis of the bit position data that is ultimately obtained.

Alternatively, the bit plane coding apparatus according to the present invention may have bit plane search means of the following structure.

This bit plane search means has a storage unit for storing bit position specifying information specifying one bit position of the n bits in association with each block of the data group, and an update control unit to which an absolute value component of each data constituting the data group is inputted and which updates the bit position specifying information stored in the storage unit every time an absolute value component is inputted.

The update control unit reads out bit position specifying information of a block to which the inputted absolute value component belongs, from the storage unit, then compares a bit position indicated by the bit position specifying information with a bit position of the most significant valid bit of the inputted absolute value component and selects the higher bit position, and updates the bit specifying information of the block in the storage unit to a content specifying the selected bit position. The storage unit outputs the bit position specifying information after the end of update with respect to the absolute value components of all the data constituting the data group, as the most significant bit plane of the bit planes including a valid bit.

In the above-described bit plane coding apparatus of the present invention, the bit position specifying information identifier for each block is held. This bit position specifying information is information specifying one bit position of the n bits. In the bit plane coding apparatus of the present invention, the bit position indicated by the bit position specifying information is compared with the bit position of the most significant valid bit of the inputted absolute value component to select the higher bit position while identifying the block of each inputted data, and the bit position specifying information of the block is updated to a content specifying the selected bit position. Then, the most significant bit plane of the bit planes including a valid bit is calculated for each block on the basis of the bit position specifying information that is ultimately obtained.

In the bit plane coding apparatus of the present invention, OR of the inputted data and the bit position data is calculated while holding the bit position data identified for each block and identifying the block of each inputted data. In the bit plane coding apparatus of the present invention, the result of the calculation is held as new bit position data. In the bit plane coding apparatus of the present invention, the above-described OR calculation is carried out for all the data of the data group as a coding target, and the most significant bit plane of bit planes including a bit having a valid value is calculated for each block on the basis of the bit position data that is ultimately obtained.

Thus, in the bit plane coding apparatus, search processing for a bit plane where a significant coefficient appears first can be carried out with a simple structure.

In the above-described bit plane coding apparatus of the present invention, the bit position specifying information identifier for each block is held. This bit position specifying information is information specifying one bit position of the n bits. In the bit plane coding apparatus of the present invention, the bit position indicated by the bit position specifying information is compared with the bit position of the most significant valid bit of the inputted absolute value component to select the higher bit position while identifying the block of each inputted data, and the bit position specifying information of the block is updated to a content specifying the selected bit position. Then, the most significant bit plane of the bit planes including a valid bit is calculated for each block on the basis of the bit position specifying information that is ultimately obtained.

Thus, in the bit plane coding apparatus, search processing for a bit plane where a significant coefficient appears first can be carried out with a simple structure.

DESCRIPTION OF THE PREFERRED EMBODIMENTS

As an embodiment of the present invention, a JPEG2000 coding apparatus to which the present invention is applied will now be described.

Figure 1:
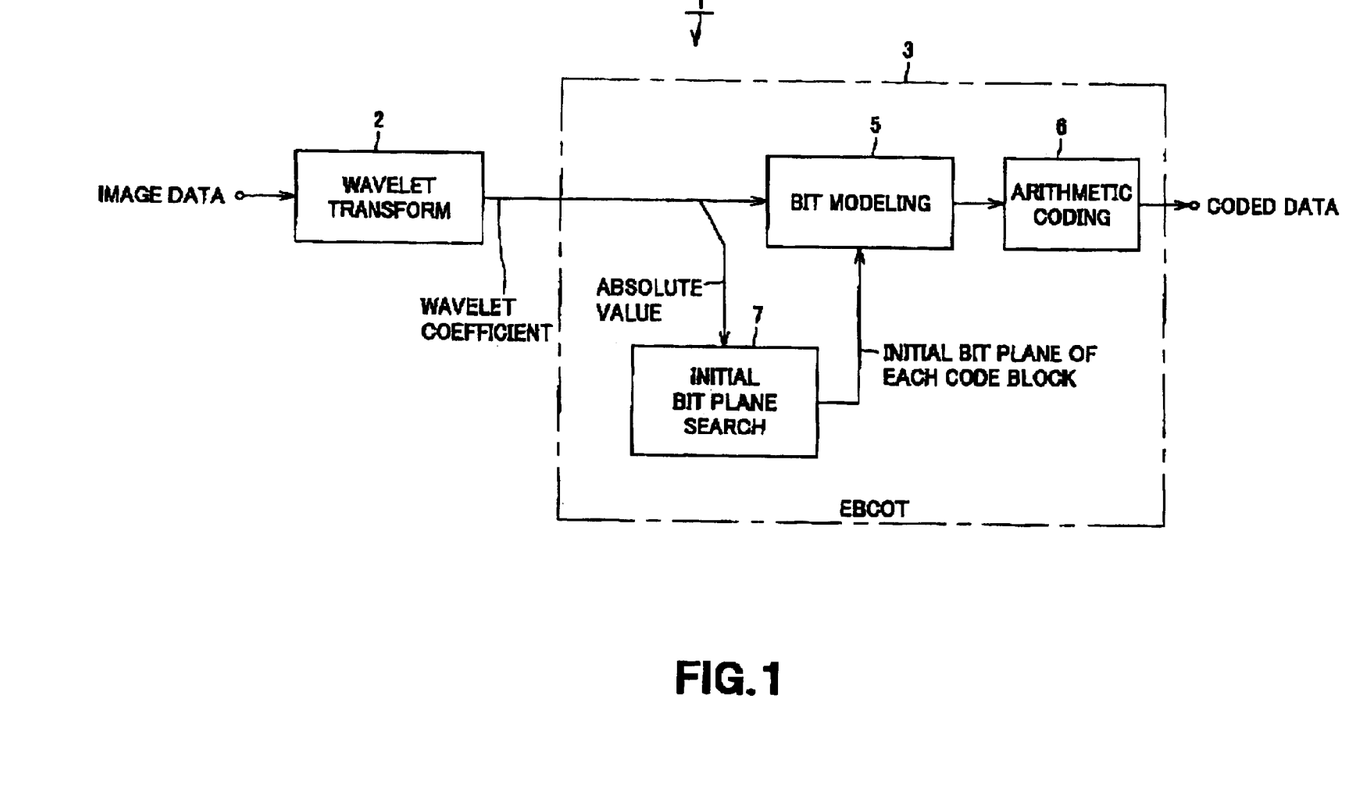
FIG. 1 is a block structural diagram showing a coding apparatus of JPEG2000 to which the present invention is applied.

FIG. 1 shows a block structural diagram of the JPEG2000 coding apparatus of the embodiment of the present invention.

A JPEG2000 coding apparatus 1 has a wavelet transform unit 2 and an EBCOT coding unit 3, as shown in FIG. 1.

The wavelet transform unit 2 performs two-dimensional discrete wavelet transform to inputted image data. The two-dimensional wavelet transform is performed to a predetermined transform area (wavelet transform area) of two-dimensional arrays in horizontal and vertical directions. The wavelet transform area to which the two-dimensional wavelet transform has been performed is divided into plural subbands as shown in FIG. 9.

From the wavelet transform unit 2, a wavelet coefficient is outputted for each wavelet transform area. The wavelet coefficient is multi-valued data made up of a sign value and an absolute value.

The EBCOT coding unit 3 performs bit modeling processing based on the EBCOT system and arithmetic coding processing based on the EBCOT system to the wavelet coefficient outputted from the wavelet transform unit 2, and thus generates coded data and outputs the coded data to outside.

The EBCOT coding unit 3 has a bit modeling unit 5, an arithmetic coding unit 6, and a bit plane search unit 7.

The bit modeling unit 5 performs bit modeling processing based on the EBCOT system to the inputted wavelet coefficient. That is, the bit modeling unit 5 generates a symbol and a context for arithmetic coding from the wavelet coefficient. The bit modeling unit 5 outputs the generates symbol and context to the arithmetic coding unit 6.

The arithmetic coding unit 6 performs arithmetic coding processing based on the inputted symbol and context, thus generating coded data. The arithmetic coding is the coding processing to segment a probability line in accordance with the probability of occurrence of a symbol sequence and allocate a binary decimal value indicating a position within a segment to a code corresponding to the code sequence. The arithmetic coding unit 6 outputs the generated coded data to outside.

To the initial bit plane search unit 7, an absolute value component of the wavelet coefficient inputted from the wavelet transform unit 2 is inputted. The absolute value component of the wavelet coefficient is hereinafter referred to as absolute value data. The initial bit plane search unit 7 identifies the inputted absolute value data for each code block and performs initial bit plane search processing to each code block as preprocessing of bit modeling processing. The initial bit plane search processing is the processing to detect an "initial bit plane" within a code block. An initial bit plane is the most significant bit plane of bit planes including a bit having a valid value (in the case of positive logic, a bit having a value "1").

Three specific exemplary structures of the initial bit plane search unit 7 will now be described. The absolute value data, which is the absolute value component of the wavelet transform, is inputted from the wavelet transform unit 2 to the initial bit plane search unit 7. In the following description, the absolute value data has a bit width of 11 bits and each bit value is assumed to be expressed in positive logic.

(First Exemplary Structure)

First, a first exemplary structure of the initial bit plane search unit 7 will be described with reference to FIG. 2.

Figure 2:
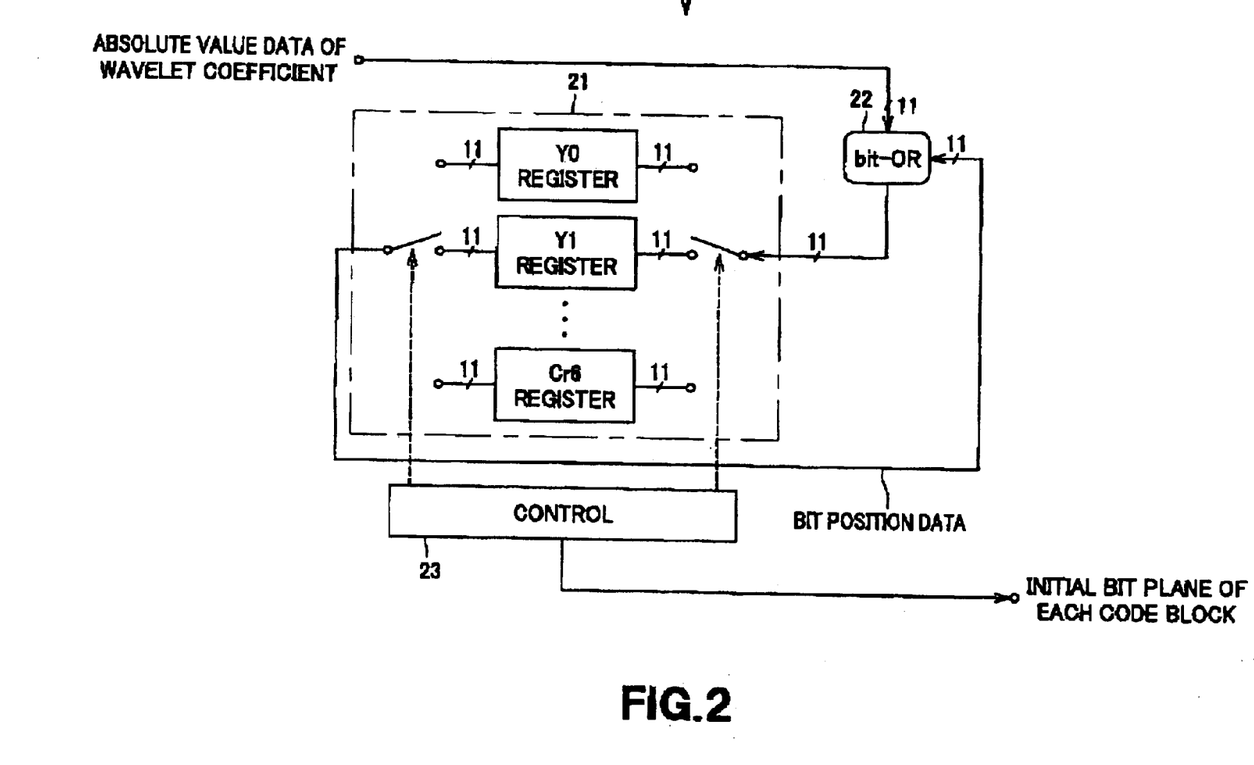
FIG. 2 is a block structural diagram showing a first exemplary structure of an initial bit plane search unit.

The initial bit plane search unit 7 of the first exemplary structure has a storage unit 21, a bit OR circuit 22, and a control unit 23, as shown in FIG. 2.

The storage unit 21 has plural registers therein. The registers within the storage unit 21 are provided corresponding to the number of code blocks generated in one wavelet transform area. The registers correspond to the specified code blocks, respectively. For example, in the case of processing the wavelet transform area shown in FIGS. 11 and 12, 16 registers (Y0 register, Y1 register, . . . , Y15 register) corresponding to the code blocks in the luminance component (Y) and 14 registers (Cb0 register, Cb1 register, . . . , Cb6 register, Cr0 register, . . . , Cr6 register) corresponding to the code blocks in the color-difference components (Cr, Cb) are provided in the storage unit 21.

Bit position data is stored in these registers. The bit position data is data having the same bit width as the absolute value data inputted to the initial bit plane search unit 7. In short, the bit position data in this case is data having a 11-bit width.

The control unit 23 selects one of the plural registers in the storage unit 21 and controls writing and reading of the bit position data to and from the selected register. The control unit 23 also calculates an initial bit plane of each code block on the basis of the bit position data stored in the registers, after all the absolute value data of the wavelet coefficient in one wavelet transform area are inputted and the processing to these data is completed.

To the bit OR circuit 22, the 11-bit absolute value data supplied from the wavelet transform unit 2 and the 11-bit bit position data stored in the storage unit 21 are inputted. Of the plural bit position data stored in the storage unit 21, only one bit position data is inputted thereto. The bit position data to be inputted is selected by the control twit 23. The bit OR circuit 22 calculates bit OR of the absolute value data and the bit position data. In the calculation of bit OR, OR of the two 11-bit data is calculated for each digit and the result of the calculation is outputted as 11-bit data. The calculation result data of bit OR is stored into the register selected by the control unit 23.

The operation of the initial bit plane search unit 7 of the first exemplary structure will now be described.

The absolute value data is inputted to the initial bit plane search unit 7 from the wavelet transform unit 2. All the wavelet coefficients in one wavelet transform area are sequentially inputted by one data each to the initial bit plane search unit 7. The inputted absolute value data of the wavelet coefficients are inputted to the bit OR circuit 22.

When one absolute value data is inputted to the control unit 23, the control unit 23 judges to which code block in the wavelet transform area the absolute value data belongs. Specifically, the control unit 23 judges whether the absolute value data is a luminance component, a Cr component or a Cb component, and also judges the ordinal number of the code block to which the absolute value data belongs. After judging the code block to which the inputted absolute value data belongs, the control unit 23 selects a register corresponding to the code block. The control unit 23 reads out the bit position data from the selected register and supplies the bit position data to the bit OR circuit 22. The bit position data stored in each register has its value initialized to 0(000_0000_0000) when the first data in the wavelet transform area is inputted. The bit OR circuit 22 calculates bit OR of the inputted one absolute value data and the selected one bit position data. The control unit 23 stores the calculation result data from the bit OR circuit 22 to the selected register, that is, the register corresponding to the code block to which the inputted absolute value data belongs. Therefore, the calculation result data from the bit OR circuit 22 becomes new bit position data of that code block.

The control unit 23 performs the above-described processing once to each of the subsequently inputted absolute value data.

The initial bit plane search unit 7 performs the above-described processing to all the coefficients in one wavelet transform area, thereby calculating bit OR with all the absolute value data for each code block and saving the result of the bit OR calculation to the registers corresponding to the respective code blocks.

When the processing to all the data in one wavelet transform area ends, the control unit 23 calculates an initial bit plane of each code block with reference to the bit position data in each register.

The bit position data is the result of bit OR calculation with all the data in a code block. Therefore, in the bit position data, the bit value of a digit corresponding to a bit plane including a significant bit (that is, a bit plane including a bit having a value "1" is necessarily "1". On the other hand, in the bit position data, the bit value of a di corresponding to a bit plane consisting of insignificant bits alone (that is, a bit plane consisting of bits having a value "0") is necessarily "0". Therefore, the ultimately obtained bit position data is searched from the MSB side and a digit where the first "1" appears indicates the position of an initial bit plane.

The control unit 23 supplies the position information of the initial bit plane of each code block to the bit modeling unit 5 and then performs processing to the next wavelet transform area.

(Second Exemplary Structure)

A second exemplary structure of the initial bit plane search unit 7 will now be described with reference to FIG. 3.

Figure 3:
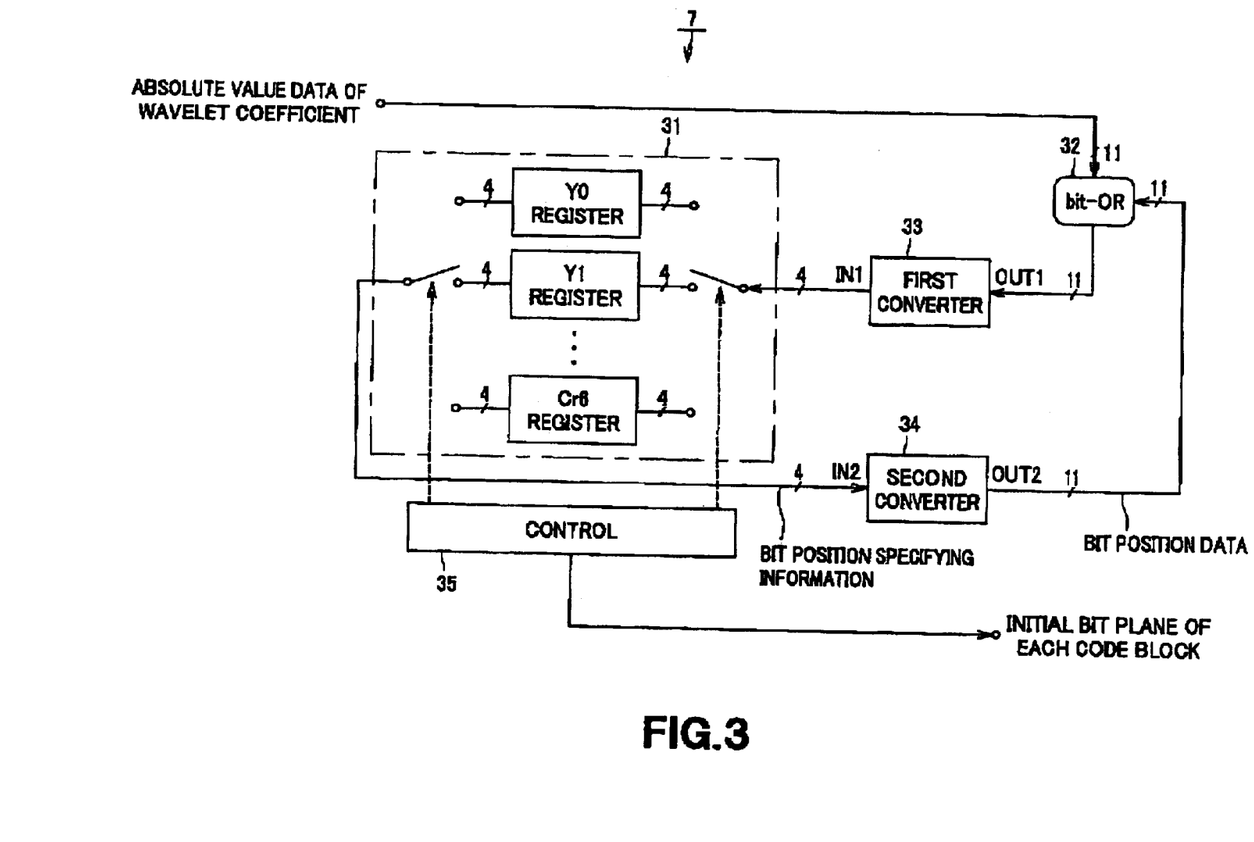
FIG. 3 is a block structural diagram showing a second exemplary structure of the initial bit plane search unit.

The initial bit plane search unit 7 of the second exemplary structure has a storage unit 31, a bit OR circuit 32, a first converter 33, a second converter 34, and a control unit 35, as shown in FIG. 3.

The storage unit 31 has plural registers then. The number of these registers is the same as that of the storage unit 21 of the above-described first exemplary structure. That is, the registers within the storage unit 31 are provided corresponding to the number of code blocks generated in one wavelet transform area. The registers correspond to the specified code blocks, respectively. For example, in the case of processing the wavelet transform area shown in FIG. 10, 16 registers corresponding to the code blocks in the luminance component (Y) and 14 registers corresponding to the code blocks in the color-difference components (Cr, Cb) are provided in the storage unit 31.

The storage unit 31 has plural registers therein. The registers within the storage unit 31 are provided corresponding to the number of code blocks generated in one wavelet transform area. The registers correspond to the specified code blocks, respectively. For example, in the case of processing the wavelet transform area shown in FIGS. 11 and 12, 16 registers (Y0 register, Y1 register, . . . , Y15 register) corresponding to the code blocks in the luminance component (Y) and 14 registers (Cb0 register, Cb1 register, . . . , Cb6 register, Cr0 register, . . . , Cr6 register) corresponding to the code blocks in the color-difference components 'Cr, Cb) are provided in the storage unit 31.

Bit position specifying information is stored into these registers. The bit position specifying information is information specifying one bit position of the absolute value data inputted to the initial bit plane search unit 7. For example, if the absolute value data has a bit width of n bits, the bit position specifying information specifies an arbitrary one digit of the n bits. Therefore, the data width of the bit position specifying information may be at least "Raise (log 2n)". "Raise(x)" means round up decimal places of x. In this example, since the absolute value data of the wavelet transform coefficient is expressed by 11 bits, the bit width of the bit position specifying information may be 4 bits or more, Therefore, compared with the above-described first exemplary structure, the data width of the registers can be decreased by 7 bits and the circuit scale can be reduced.

The control unit 35 selects one of the plural registers in the storage unit 31 and controls writing and reading of the bit position specifying information to and from the selected register. The control unit 35 also calculates an initial bit plane of each code block on the basis of the bit position specifying information stored in the registers, after all the absolute value data of the wavelet coefficient in one wavelet transform area are inputted and the processing to these data is completed.

To the bit OR circuit 32, the 11-bit absolute value data supplied from the wavelet transform unit 2 and 11-bit bit position data outputted from the second converter 34 are inputted. The bit position data outputted from the second converter 34 is generated on the basis of the bit position specifying information stored in the storage unit 31. While the plural pieces of bit position specifying information are stored in the storage unit 31, the bit position data outputted from the second converter 34 is generated on the basis of only one piece of bit position specifying information selected by the control unit 35. The bit OR circuit 32 calculates bit OR of the absolute value data and the bit position data. The calculation result data of bit OR is inputted to the first converter 33.

The first converter 33 performs processing to convert the 11-bit calculation result data outputted from the bit OR circuit 32 to 4-bit bit position specifying information. The first converter 33 searches the 11-bit calculation result data to detect a bit position where the first "1" occurs, and then generates bit position specifying information specifying the detected bit position.

Figure 4:
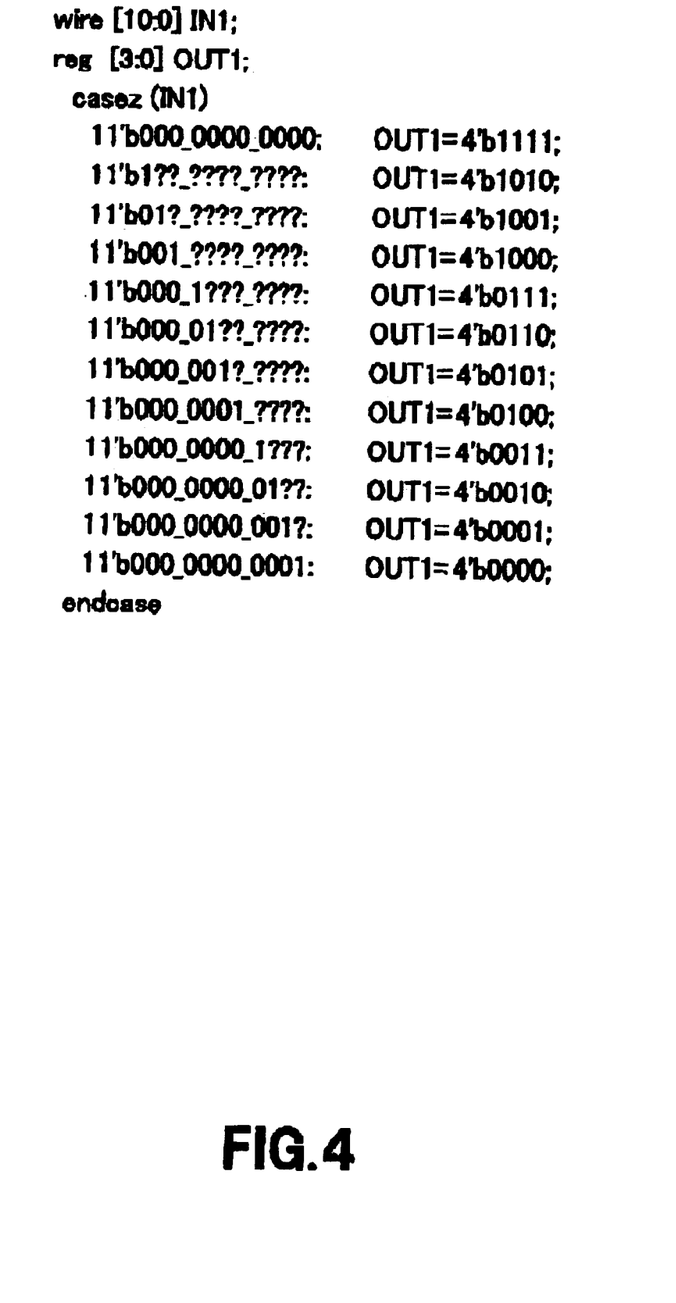
FIG. 4 is a view for explaining an exemplary description of HDL of a first converter.

Specifically, the processing of the first converter 33 can be described as a table as shown in FIG. 4. The program description language shown in FIG. 4 is the hardware description language (HDL) used for LSI development.

"wire[10:0] IN1;" defines that input data has a data width of 11 bits and an input data name "IN1". "IN1" is the 11-bit calculation result data outputted from the bit OR circuit 32.

"reg[3:0] OUT1," defines that output data has a data width of 4 bits and an output data name "OUT1". "OUT1" is the 4-bit bit position specifying information stored into the register in the storage unit 31.

"casez(IN1)" to "endcasez" are so-called case sentences for using the data contents of the 11-bit input data (IN1) as a condition and selecting and outputting 4-bit output data (OUT1) matching the condition.

The following are specific input/output relations defined by "casez(IN1)" to "endcasez".

| Input data (IN1) | Output data (OUT1) |
|---|---|
| 000_0000_0000 | 1111 |
| 1??_????_???? | 1010 |
| 01?_????_???? | 1001 |
| 001_????_???? | 1000 |
| 000_1???_???? | 0111 |
| 000_01??_???? | 0110 |
| 000_001?_???? | 0101 |
| 000_0001_???? | 0100 |
| 000_0000_1??? | 0011 |
| 000_0000_01?? | 0010 |
| 000_0000_001? | 0001 |
| 000_0000_0001 | 0000 |

The value of a bit expressed by "?" may be "1" or "0". In these case sentences, only the bit position where the first "1" occurs is necessary and the subsequent bit values are not important.

The second converter 34 performs processing to convert the bit position specifying information outputted from the register in the storage unit 31 to bit position data to be inputted to the bit OR circuit 32. The second converter 34 generates bit position data such that only the bit position indicated by the bit position specifying information is represented by "1" while the other bits are represented by "0". The bit position data to be generated here is data having the same number of bits as the absolute value data. That is, it is 11-bit data.

Figure 5:
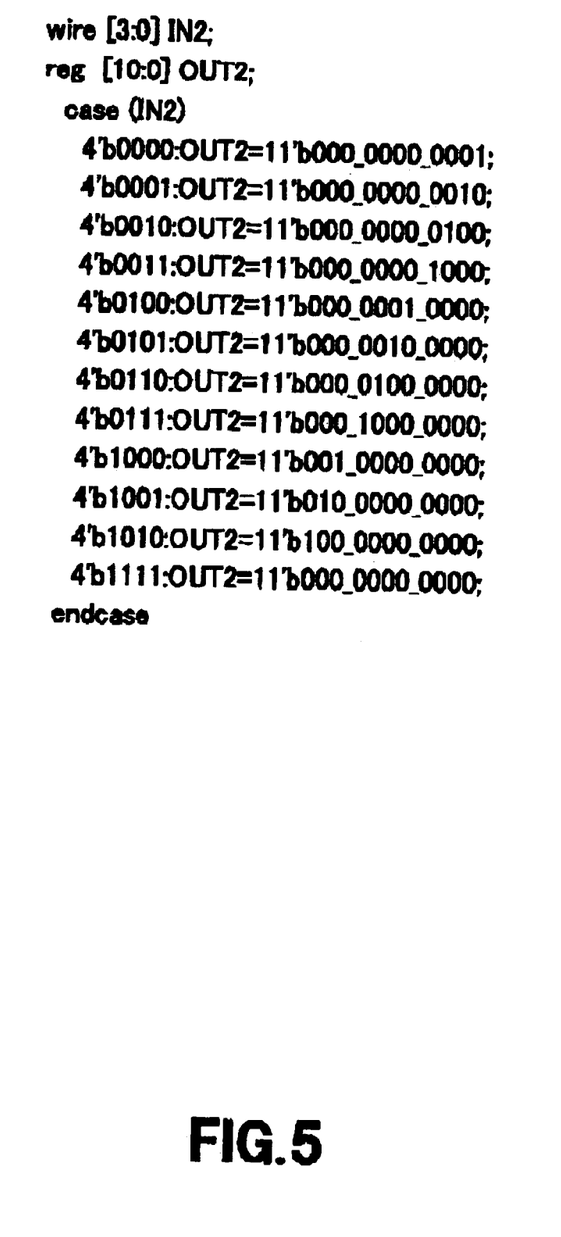
FIG. 5 is a view for explaining an exemplary description of HDL of a second converter.

Specifically, the processing of the second converter 34 can be described as a table as shown in FIG. 5. Again, the program description language shown in FIG. 5 is the HDL.

"wire[3:0] IN2;" defines that input data has a data width of 3 bits and an input data name "IN2". "IN2" is the 4-bit bit position specifying information outputted from the register of the storage unit 31.

"reg[10:0] OUT2;" defines that output data has a data width of 11 bits and an output data name "OUT2". "OUT2" is the 11-bit bit position data inputted to the bit OR circuit 32.

"case(IN2)" to "endcase" are so-called case sentences for using the data contents of the 4-bit input data (IN2) as a condition and selecting and outputting 11-bit output data (OUT1) matching the condition.

The following are specific input/output relations defined by "case(IN2)" to "endcase".

| Input data (IN2) | Output data (OUT2) |
|---|---|
| 0000 | 000_0000_0001 |
| 0001 | 000_0000_0010 |
| 0010 | 000_0000_0100 |
| 0011 | 000_0000_1000 |
| 0100 | 000_0001_0000 |
| 0101 | 000_0010_0000 |
| 0110 | 000_0100_0000 |
| 0111 | 000_1000_0000 |
| 1000 | 001_0000_0000 |
| 1001 | 010_0000_0000 |
| 1010 | 100_0000_0000 |
| 1111 | 000_0000_0000 |

The operation of the initial bit plane search unit 7 of this second exemplary structure will now be described.

The absolute value data is inputted to the initial bit plane search unit 7 from the wavelet transform unit 2. All the wavelet coefficients in one wavelet transform area are sequentially inputted by one data each to the initial bit plane search unit 7. The inputted absolute value data of the wavelet coefficients are inputted to the bit OR circuit 32.

When one absolute value data is inputted to the control unit 35, the control unit 35 judges to which code block in the wavelet transform area the absolute value data belongs. Specifically, the control unit 35 judges whether the absolute value data is a luminance component, a Cr component or a Cb component, and also judges the ordinal number of the code block to which the absolute value data belongs After judging the code block to which the inputted absolute value data belongs, the control unit 35 selects a register corresponding to the code block The control unit 35 reads out the bit position specifying information from the selected register and supplies the bit position specifying information to the second converter 34. The bit position specifying information stored in each register has its value initialized to "1111" when the first data in the wavelet transform area is inputted. The second converter 34 converts the inputted 4-bit bit position specifying information to 11-bit bit position data in accordance with the table shown in FIG. 5. The resulting bit position data is supplied to the bit OR circuit 32.

The bit OR circuit 32 calculates bit OR of the inputted one absolute value data and the one bit position data outputted from the second converter 34. The 11-bit calculation result data of bit OR is supplied to the first converter 33. The first converter 33 converts the inputted 11-bit calculation result data to 4-bit bit position specifying information in accordance with the table shown in FIG.4.

The control unit 35 stores the output of the first converter 33 to the selected register, that is, the register corresponding to the code block to which the inputted absolute value data belongs Therefore, the bit position specifying information generated on the basis of the result of bit OR calculation becomes new bit position specifying information.

The control unit 35 performs the above-described processing once to each of the subsequently inputted absolute value data The initial bit plane search unit 7 performs the above-described processing to all the coefficients in one wavelet transform area, thereby calculating bit OR with all the absolute value data for each code block, and the bit position specifying information based on the result of calculation is generated. That is, the bit position specifying information ultimately stored in the register indicates the initial bit plane of each code block.

When the processing to all the data in one wavelet transform area ends, the control unit 35 calculates an initial bit plane of each code block with reference to the bit position specifying information in each register.

The control unit 35 supplies the position information of the calculated initial bit plane of each code block to the bit modeling unit 5 and then performs processing to the next wavelet transform area.

(Third Exemplary Structure)

A third exemplary structure of the initial bit plane search unit 7 will now be described with reference to FIG. 6.

Figure 6:
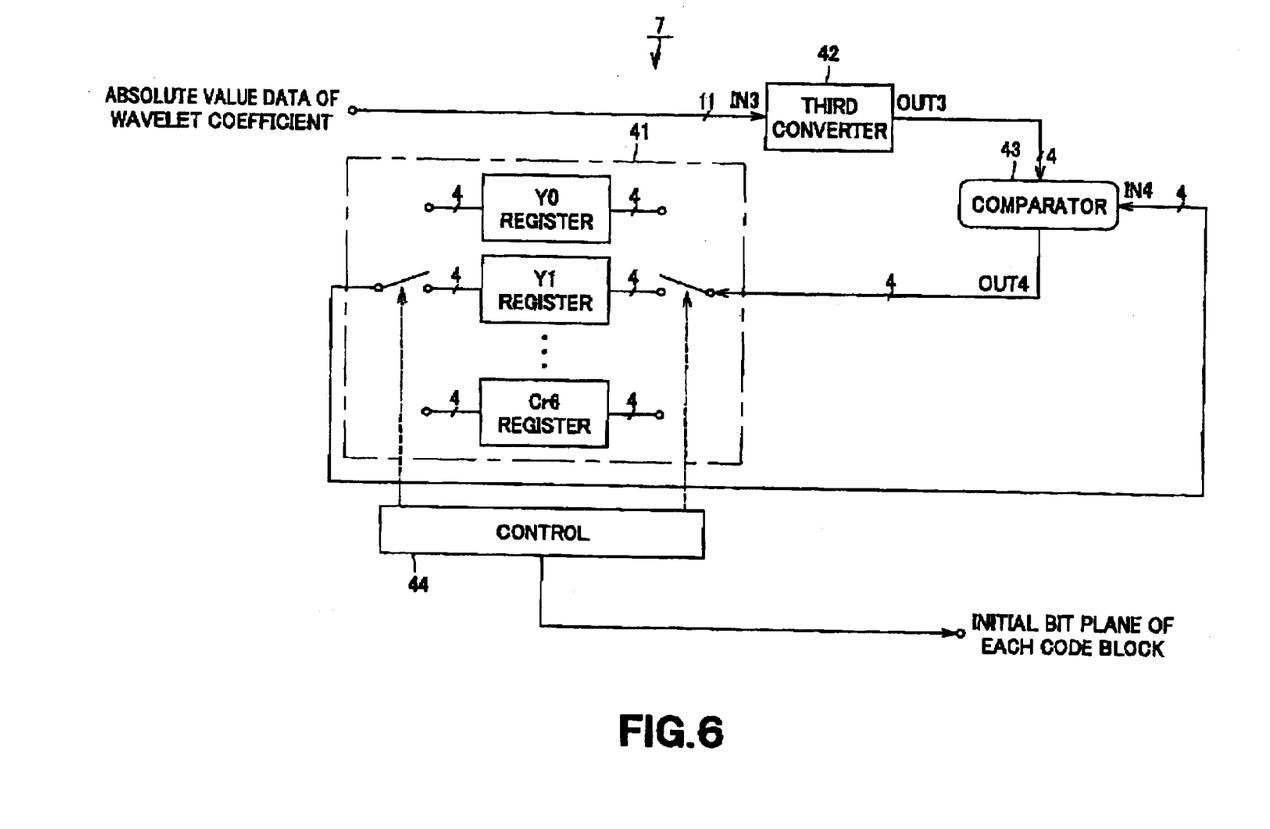
FIG. 6 is a block structural diagram showing a third exemplary structure of the initial bit plane search unit.

The initial bit plane search unit 7 of the third exemplary structure has a storage unit 41, a third converter 42, a comparator 43, and a control unit 44, as shown in FIG. 6.

The storage unit 41 has the same structure as the storage unit 31 of the above-described second exemplary structure.

The control unit 44 selects one of plural registers in the storage unit 41 and controls writing and reading of bit position specifying information to and from the selected register. The control unit 44 also calculates an initial bit plane of each code block on the basis of the bit position specifying information stored in the registers, after all the absolute value data of the wavelet coefficient in one wavelet transform area are inputted and the processing to these data is completed.

The third converter 42 performs processing to convert inputted 11-bit absolute value data to 4-bit bit position specifying information. The third converter 42 searches the 11-bit calculation result data from its MSB to detect a bit position where the first "1" occurs, and then generates bit position specifying information specifying the detected bit position.

Figure 7:
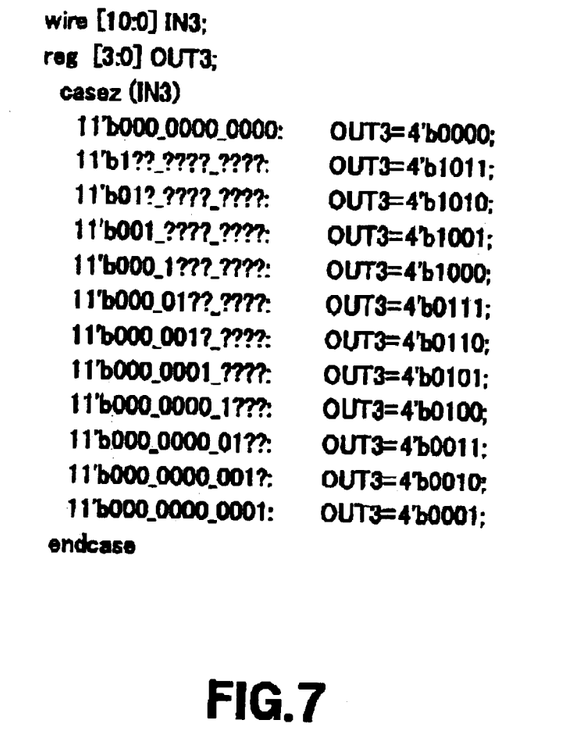
FIG. 7 is a view for explaining an exemplary description of HDL of a third converter.

Specifically, the processing of the third converter 42 can be described as a table as shown in FIG. 7. The program description language shown in FIG. 7 is the hardware description language (HDL) used for LSI development.

"wire[10:0] IN3;" defines that input data has a data width of 11 bits and an input data name "IN3". "IN3" is the inputted 11-bit absolute value data, "reg[3:0] OUT3; " defines that output data has a data width of 4 bits and an output data name "OUT3". "OUT3"

is the 4-bit bit position specifying information to be inputted to the comparator 43.

"casez(IN3)" to "endcasez" are so-called case sentences for using the data contents of the 11-bit input data (IN3) as a condition and selecting and outputting 4-bit output data (OUT3) matching the condition.

The following are specific input/output relations defined by "casez(IN1)" to "endcasez".

| Input data (IN3) | Output data (OUT3) |
|---|---|
| 000_0000_0000 | 0000 |
| 1??_????_???? | 1011 |
| 01??_????_???? | 1010 |
| 001_????_???? | 1001 |
| 000_1???_???? | 1000 |
| 000_01??_???? | 0111 |
| 000_001?_???? | 0110 |
| 000_0001_???? | 0101 |
| 000_0000_1??? | 0100 |
| 000_0000_01?? | 0011 |
| 000_0000_001? | 0010 |
| 000_0000_0001 | 0001 |

The value of a bit expressed by "?" may be "1" or "0". In these case sentences, only the bit position where the first "1" occurs is necessary and the subsequent bit values are not important.

To the comparator 43, the bit position specifying information outputted from the third converter 42 and the bit position specifying information stored in the register are inputted. The comparator 43 selects and outputs the bit position specifying information having the larger value, of the inputted two pieces of bit position specifying information. The selected bit position specifying information is stored as new bit position specifying information into the register selected by the control unit 44, that is, the register of the code block to which the inputted absolute value data belongs.

Figure 8:
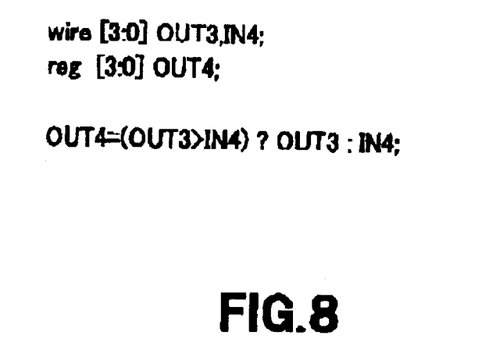
FIG. 8 is a view for explaining an exemplary description of HDL of a comparator.

Specifically, the processing of the comparator 43 can be described as a table as shown in FIG. 8. The program description language shown in FIG. 8 is the HDL.

"wire[10.0] OUT3, IN4;" defines that there are two input data and that the input data have a data width of 3 bits each and input data names "OUT3" and "IN4", respectively. "OUT3" is the bit position specifying information outputted from the third converter 42. "IN4" is the bit position specifying information stored in the register selected by the control unit 44.

"reg[3:0] OUT4;" defines that output data has a data width of 4 bits and an output data name "OUT4". "OUT4" is the 4-bit bit position data to be inputted to the register selected by the control unit 44.

"OUT4=(OUT3>IN4)?OUT3:IN4" indicates that "OUT3" is outputted if the condition of OUT3>IN4 is met, whereas "IN4" is outputted otherwise.

The operation of the initial bit plane search unit 7 of this third exemplary structure Will now be described.

The absolute value data is inputted to the initial bit plane search unit 7 from the wavelet transform unit 2. All the wavelet coefficients in one wavelet transform area are sequentially inputted by one data each to the initial bit plane search unit 7. The inputted absolute value data of the wavelet coefficients are inputted to the third converter 42. The third converter 42 converts the inputted 11-bit absolute value data to 4-bit bit position specifying information in accordance with the table shown in FIG. 7.

When one absolute value data is inputted to the control unit 44, the control unit 44 judges to which code block in the wavelet transform area the absolute value data belongs. Specifically, the control unit 44 judges whether the absolute value data is a luminance component, a Cr component or a Cb component, and also judges the ordinal number of the code block to which the absolute value data belongs. After judging the code block to which the inputted absolute value data belongs, the control unit 44 selects a register corresponding to the code block. The control unit 44 reads out the bit position specifying information from the selected register and supplies the bit position specifying information to the comparator 43. The bit position specifying information stored in each register has its value initialized to "0000" when the first data in the wavelet transform area is inputted.

The comparator 43 compares the one bit position specifying information inputted from the third converter 42 with the one bit position specifying information outputted from the register in accordance with the program shown in FIG. 8 and outputs the bit position specifying information having the larger value The control unit 44 stores the output of the comparator 43 to the selected register. That is, the bit position specifying information having the larger value, as a result of comparison, is stored into the register as new bit position specifying information.

The control unit 44 also performs the above-described processing to the subsequent absolute value data.

As the initial bit plane search unit 7 performs the above-described processing, the bit position specifying information having the largest value of all the absolute value data is stored into the register. That is, the bit position specifying information ultimately stored in the register indicates the initial bit plane of each code block.

When the processing to all the data in one wavelet transform area ends, the control unit 44 calculates an initial bit plane of each code block with reference to the bit position specifying information in each register.

The control unit 44 supplies the position information of the calculated initial bit plane of each code block to the bit modeling unit 5 and then performs processing to the next wavelet transform area.

While the invention has been described in accordance with certain preferred embodiment thereof illustrated in the accompanying drawings and described in the above description in detail, it should be understood by those ordinarily skilled in the art that the invention is not limited to the embodiment, but various modifications, alternative constructions or equivalents can be implemented without departing from the scope and spirit of the present invention as set forth and defined by the appended claims.

What is claimed is:

1. A bit plane coding apparatus for dividing a data group including plural data with their absolute value components expressed by n bits (n being a natural number) into at least one or more blocks and coding each of the blocks by bit plane, the bit plane coding apparatus comprising:

bit plane search means for searching each block for the most significant bit plane of bit planes including a bit having a valid value (value bit), the bit plane search means comprising:

a storage unit for storing bit position data of the n bits in association with each block within the data group;

a selection control unit for selecting the bit position data in the storage unit; and a bit OR calculating unit to which the absolute value component of each data constituting the data group is inputted and which calculates bit OR of the inputted absolute value component and the bit position data selected by the selection control unit, wherein the selection control unit reads out the bit position data of a block to which the absolute value component inputted to the bit OR calculating unit belongs, from the storage unit, then causes the OR calculating unit to calculate bit OR of the bit position data and the inputted absolute value component, stores the result of the calculation into the storage unit as new bit position data of the block, and calculates the most significant bit plane of the bit planes including a bit having a valid value (valid bit) for each block on the basis of the bit position data stored in the storage unit after all the data of the data group is inputted.

2. A bit plane coding apparatus for dividing a data group including plural data with their absolute value components expressed by n bits (n being a natural number) into at least one or more blocks and coding each of the blocks by bit plane, the bit plane coding apparatus comprising:

bit plane search means for searching each block for the most significant bit plane of bit planes including a bit having a valid value (value bit), the bit plane search means comprising:

a storage unit for storing bit position specifying information specifying one bit position of then bits in association with each block of the data group, and an update control unit to which an absolute value component of each data constituting the data group is inputted and which updates the bit position specifying information stored in the storage unit every time the absolute value component of each data is inputted, wherein the update control unit reads out bit position specifying information of a block to which the inputted absolute value component belongs, from the storage unit, then compares a bit position indicated by the bit position specifying information with the bit position of the most significant valid bit of the inputted absolute value component and selects the higher bit position, and updates the bit specifying information of the block in the storage unit to a content specifying the selected bit position, and the storage unit outputs the bit position specifying information after the end of update with respect to the absolute value components of all the data constituting the data group, as the most significant bit plane of the bit planes including a valid bit.

3. The bit plane coding apparatus as claimed in claim 2, wherein the update control unit comprises:

an input/output control unit for controlling input/output of the bit position specifying information in the storage unit;

a first data converter unit to which the bit position specifying information in the storage unit is inputted and which outputs n-bits converted data such that the bit value of a bit position specified by the inputted bit position specifying information is valid and the bit value of a higher bit than the bit position is invalid;

a bit OR calculating unit to which the absolute value component and the convened data are inputted and which calculates bit OR of the inputted absolute value component and the converted data and outputs n-bit OR data; and a second data converter unit to which the OR data is inputted and which generates bit position specifying information specifying the bit position of the most significant valid bit of the inputted OR data, and the input/output control unit reads our bit position specifying information of a block to which the absolute value component inputted to the bit OR calculating unit belongs, from the storage unit, and inputs the bit position specifying information to the first data converter unit, and stores the bit position specifying information outputted from the second data converter unit as new bit position specifying information of the block to which the absolute value component inputted to the bit OR calculating unit belongs.

4. The bit plane coding apparatus as claimed in claim 2, wherein the update control unit comprises:

an input/output control unit for controlling input/output of the bit position specifying information in the storage unit;

a third data converter unit to which the absolute value component is inputted and which generates bit position specifying information specifying the bit position of the most significant valid bit of the inputted absolute value component; and a comparator unit to which the bit position specifying information in the third data converter unit and the storage unit is inputted and which compares the inputted two pieces of bit position specifying information and outputs the bit position specifying information having a higher bit, and the input/output control unit reads out bit position specifying information of a block to which the absolute value component inputted to the third data converter belongs, from the storage unit, and inputs the bit position specifying information to the comparator, and stores the bit position specifying information outputted from the comparator as new bit position specifying information of the block to which the absolute value component inputted to the third data converter unit belongs.

* * * * *